Patented Nov. 9, 1948

2,453,569

UNITED STATES PATENT OFFICE 2,453,569

PLASTICIZED POLYVINYL ACETAL RESIN

Max O. Debacher, Springfield, Mass., assignor to Monsanto Chemical Company, St. Louis, Mo., a corporation of Delaware No Drawing. Application June 30, 1945,
Serial No. 602,665

14 Claims. (Cl. 260—23)

This invention relates to improved compositions comprising polyvinyl acetal resins and esters of polyhydric alcohol and poly-unsaturated long-chain fatty acids. More particularly, this invention relates to compositions comprising polyvinyl acetal resins and blown drying or semi-drying oils.

It is an object of this invention to provide improved polyvinyl acetal resin compositions. A further object is to provide stable, plasticized polyvinyl acetal resins. Another object is to provide polyvinyl acetal resin compositions capable of being rendered resistant to solvents.

These and other objects are attained by incorporating blown esters of polyhydric alcohols and poly-unsaturated long-chain fatty acids with polyvinyl acetal resins. According to a particular embodiment of this invention blown drying or semi-drying oils are incorporated with polyvinyl acetal resins.

The following examples illustrate the improved compositions of the present invention, but are not to be construed as limitative thereof. Where parts are specified, the parts are by weight.

The polyvinyl acetal resin employed in the examples is prepared from a polyvinyl acetate of such a degree of polymerization that a 1-molar benzene solution possesses a viscosity of substantially 50–55 centipoises at 20° C. The polyvinyl acetal resin can be considered to be made up on a weight basis of 16–20% hydroxyl groups calculated as polyvinyl alcohol, less than 3% acetate groups calculated as polyvinyl acetate and the balance substantially butyraldehyde acetal.

The components of the illustrative composition in Examples 1 to 6 are set forth below in Table I. The several ingredients are mixed in a suitable manner, for example, in a Banbury mixer. The resulting compositions exhibit the properties which characterize the products of the invention. Thus, they are tough, water-resistant and homogeneous. They may be formed into articles of various shapes, for example, they may be extruded in sheet form or they may be dissolved in suitable solvents, for example, ethanol-toluene mixtures, to form coating or impregnating compositions. No exudation of plasticizer from the compositions occurs on long continued use and the compositions exhibit high retentivity of plasticizer over long periods of time even at elevated temperatures.

Table I

| Example | Polyvinyl butyraldehyde acetal resin | Blown oil | Additional plasticizer |
|---|---|---|---|
| | Parts | | |
| 1 | 100 | Linseed, 15 parts | Dibutyl Sebacate, 30 parts. |
| 2 | 100 | Soybean, 15 parts | Sebacate, 30 parts. |
| 3 | 100 | Linseed, 50 parts | |
| 4 | 100 | ....do........ | Castor Oil, 25 parts. |
| 5 | 100 | ....do........ | Methyl Ricinoleate, 50 parts. |
| 6 | 100 | Linseed, 25 parts | Butyl Ricinoleate, 25 parts. |

The plastic compositions described in Examples 1 to 6 are formed into sheets 0.015 inch in thickness by molding the compositions into blocks of plastic under heat and pressure and then cutting sheets therefrom in the well-known manner for processing thermoplastic materials.

It is unexpectedly discovered that these sheets after heating at about 105° C. for about 5 hours are rendered highly resistant to materials which are solvents for the untreated sheets. For example, sheets treated in this manner on immersion in ethanol at room temperature for several days are not dissolved. A slight amount of swelling occurs, but the sheets retain their original shape. From the foregoing, it is apparent that the compositions of the invention as illustrated by Examples 1–6 possess valuable and unobvious characteristics.

In contrast to the products described in Examples 1–6, sheets made from a plastic composition differing only in that the plasticizer consists of 30 parts of dibutyl sebacate for every 100 parts of the polyvinyl acetal resin is readily dissolved in ethanol after a similar heat treatment. Also, substitution of the raw oils for the blown oils in Examples 1 and 2 results in compositions having markedly poorer solvent resistance after the same heat treatment.

Compositions of the invention in which the plasticizer consists of the blown esters, as exemplified by Example 3 are particularly resistant to weathering. For example, when subjected to the Kline test such compositions exhibit markedly superior results.

The compositions of the invention also show extremely low weight losses on heating, for example, for 5 hours at 105° C. while spread out on polished metal plates. In fact, the composition described in Example 4 shows an increase in weight of about 1% on such treatment.

The polyvinyl acetal resins used in the compositions of the invention may be prepared, for example, by hydrolyzing a polyvinyl ester, for example, polyvinyl acetate, and then reacting the resulting hydrolysis product with an aldehyde. These resins may contain a certain proportion of ester and hydroxyl groups in addition to the acetal groups. U. S. patent to Morrison et al. Re. 20,430, dated June 20, 1937, illustrates suitable methods for preparing such resins. The polyvinyl acetal resins may be made from various aldehydes or mixtures thereof, or even from ketones containing an active carbonyl group. Thus, formaldehyde, acetaldehyde, propionaldehyde, butyraldehyde, valeraldehyde, hexaldehyde, benzaldehyde, cyclohexanone and the like and mixtures of two, three or more of these and other aldehydes may be employed. In general, polyvinyl acetal resins made from saturated lower aliphatic aldehydes are preferred and, in particular, polyvinyl acetal resins made with saturated aliphatic aldehydes containing less than 6 carbon atoms and especially those made with butyraldehyde, are preferred. When the polyvinyl acetal resins contain ester groups, the nature of the ester groups may be substantially varied, but are preferably residues of saturated lower aliphatic acids such as acetic, propionic and butyric acids.

The polyvinyl esters from which the polyvinyl acetal resins are derived may vary substantially in degree of polymerization as evidenced by the viscosity of 1-molar benzene solutions which may vary, for example, from 5–75 centipoises at 20° C.

The polyvinyl acetal resins contemplated according to the invention have at least about 30% of the ester groups in the original polyvinyl ester replaced by acetal groups and do not have more than about 50% of said ester groups replaced by hydroxyl groups.

According to one embodiment of this invention, the polyvinyl acetal resins employed contain, on a weight basis, at least 5% hydroxyl groups calculated as polyvinyl alcohol and, preferably, from 5 to 25% hydroxyl groups. These resins may also contain from 0 to 30% ester groups calculated as polyvinyl ester, the ester groups preferably being acetate.

According to one embodiment of this invention, when the acetal groups are butyraldehyde acetal, the resin employed may be considered to be made up, on a weight basis, of 12–22% hydroxyl groups, calculated as polyvinyl alcohol and from 15 to 30% acetate groups calculated as polyvinyl acetate and the balance substantially butyraldehyde acetal. According to another embodiment, when the acetal groups are butyraldehyde acetal, the resin employed may be considered to be made up, on a weight basis, of 16 to 20% hydroxyl groups calculated as polyvinyl alcohol, less than 3% acetate groups calculated as polyvinyl acetate and the balance substantially butyraldehyde acetal. According to another embodiment, when the acetal groups are butyraldehyde acetal, the resin employed may be considered to be made up, on a weight basis, of 5–13% hydroxyl groups calculated as polyvinyl alcohol, less than 3% acetate groups calculated as polyvinyl acetate and the balance substantially butyraldehyde acetal. Usually, the polyvinyl butyraldehyde acetal resins contain, on a weight basis, 10–20% hydroxyl groups calculated as polyvinyl alcohol.

According to one embodiment of this invention, when the acetal groups are acetaldehyde acetal, the polyvinyl acetal resin employed may be considered to be made up, on a weight basis, of 5 to 15% hydroxyl groups calculated as polyvinyl alcohol, 15 to 20% acetate groups calculated as polyvinyl acetate and the balance substantially acetaldehyde acetal.

According to one embodiment of this invention, when the acetal is formaldehyde acetal, the polyvinyl acetal resin may be considered to be made up, on a weight basis, of 5 to 10% hydroxyl groups calculated as polyvinyl alcohol, 10 to 15% acetate groups calculated as polyvinyl acetate and the balance substantially formaldehyde acetal.

An example of a mixed acetal resin is one containing, on a weight basis, 13% hydroxyl groups calculated as polyvinyl alcohol, 2 to 6% acetate groups calculated as polyvinyl acetate and the balance 65–50 mol per cent acetaldehyde acetal and 35–50 mol per cent butyraldehyde acetal.

The ester plasticizers employed according to this invention are blown polyhydric alcohol esters made with poly-unsaturated fatty acids containing more than 9 and preferably from 10 to 20 carbon atoms. Examples of polyhydric alcohols from which these esters may be made are glycerin, mannitol, sorbitol, glucose, erythritol, pentaerythritol, glycols such as ethylene glycol, diethylene glycol, triethylene glycol, tetraethylene glycol, pentaethylene glycol, and the like. Particularly preferred are polyhydric alcohols having 2–10 carbon atoms. Examples of unsaturated aliphatic acids which may be used in preparing the esters are diolefinic acids such as 9,12-octadecadienoic acid; triolefinic unsaturated aliphatic acids such as 9,12,15 - octadecatrienoic acid, docosa-4,7,11-trien-18-ynoic acid, 9,11,13-octadecatrienoic acid; substituted olefinic acids, for example, hydroxy olefinic acids, halogenated, e. g. chlorinated unsaturated acids and the like.

Mixtures of polyhydric alcohol esters of unsaturated aliphatic acids mays be employed and when desired, mixtures of these unsaturated esters with polyhydric alcohol esters of saturated aliphatic acids, as for example, such various blown fixed oils, as blown linseed, tung, soybean, perilla, sunflower, safflower, poppy seed, walnut, and dehydrated castor oils.

The acids derived from these oils consist predominantly of polyolefinic unsaturated acids containing 18 carbon atoms. For certain purposes oils such as sesame oil, corn oil, cottonseed oil and the like may be used, such oils containing substantial amounts of diolefinic unsaturated acid residues such as those mentioned above, but do not predominate therein.

Mixed esters may be employed in which at least one of the acid residues is poly-unsaturated, for example, glycerol esters in which one or two acid residues are derived from 9,12-octadecadienoic acid and the balance from octadecanoic acid, at least 25% of the acid residues being poly-unsaturated.

Blown oils, as is known to those skilled in the art, are prepared by passing a stream of air through the oil, usually while maintaining the oil at an elevated temperature, for example, at about 450–550° F. for several hours. A small amount of a drier is usually present during the blowing operation, e. g., cobalt, manganese, lead driers and the like. In preparing the blown esters used in the compositions of the invention, the blowing operation is continued until the iodine number drops about 50-70 units and the saponification number increases about 10-35 units. Thus, the oils prior to the blowing operation have an iodine number of about 100-210 and after the blowing operation about 30-160 and preferably 50-140. The saponification values before blowing are in the range 105-200 and after blowing 195-235.

The blown oils used in the specific examples are marketed under the trade names "Kellogg's Diamond K linseed oil" and "Kellogg's Diamond K soybean oil." "Diamond K linseed oil" has an iodine value of 115-130 and a saponification number of 210-225. Corresponding values for "Diamond K soybean oil" are 60-80 for the iodine value and 210-225 for the saponification number. Other commercial blown oils which may be used include "Kellogg's White Diamond K linseed oil," "Kellogg's Miscible Diamond K linseed oil" and "Kellogg's Pale Bodied varnish oil."

The methods used for preparing blown drying and semi-drying oils such as that described above may be used in blowing the other polyhydric alcohol esters of the invention, i. e., the iodine number is decreased about 50-70 units and the saponification number is increased about 10-35 units. Other oxidation conditions may be used which produce the changes in iodine number and saponification number given above.

In general, at least about 10 parts of the blown esters are employed for every 100 parts of polyvinyl acetal resin. Homogeneous compositions may be prepared using up to about 90-100 parts of the blown esters in conjunction with 15-30 parts of other plasticizers such as triethylene glycol dihexoate, dibutyl phthalate, as well as those given in the examples, although for many purposes not over 75 parts of the blown ester are preferred for every 100 parts of the polyvinyl acetal resin.

A particular feature of the invention resides in the fact that from 40-60 parts of the blown esters in admixture with 100 parts of polyvinyl acetal resin, particularly polyvinyl butyraldehyde resin containing 5-25% hydroxyl groups by weight, calculated as polyvinyl alcohol, produces homogeneous compositions that are firm and substantially free from tackiness despite the high plasticizer content. The unblown esters are not compatible with polyvinyl acetal resins in these proportions.

Various modifying materials may be incorporated in the compositions of the invention when particular properties are desired. For example, various natural and synthetic resins or the components thereof may be added, such as alkyd resins, aldehyde condensation products, for example, phenol-aldehyde, urea-aldehyde, aminotriazine-aldehyde, such as melamine-formaldehyde, dicyandiamide-aldehyde and other synthetic resins.

Polyvinyl acetal resins, aldehyde condensation products, such as those given above, and the blown esters may be combined by any suitable means. For example, solutions of the components in suitable solvents may be combined or the components may be simultaneously heat-softened and intermixed on milling rolls or in a Banbury or Werner-Pfleiderer mixer.

The proportion of aldehyde condensation or addition product may be substantially varied, for example, from about 2 to 50% based on the amount of polyvinyl acetal resin and preferably from about 4-30%.

Particularly valuable compositions are obtained by incorporating sulfur in the compositions of the invention, for example, 0.5-5 parts for every 100 parts of polyvinyl acetal resin. Thus, the addition of one part of sulfur to the composition described in Example 3 results in a composition having improved thermosetting properties and entirely free from tackiness after curing at 135° C. for 2 hours. Furthermore, a cured sheet 4 inches by ½ inch by 0.015 inch in thickness shows only about one-half as much swelling after immersion in ethanol for several days as compared with a similar sheet which does not contain sulfur. In addition, on extraction with ethanol the cured sheets containing sulfur lose only about 2-3% of their weight as compared with 7-10% for the sheets that do not contain sulfur. Another advantage of compositions containing sulfur resides in their improved cold flexibility.

The following examples in Table II further illustrate the advantages of adding sulfur to compositions of the invention.

Table II

| Examples | Polyvinyl butyraldehyde acetal resin | Blown linseed oil | Butyl ricinoleate | Sulfur |
|---|---|---|---|---|
| | Parts | Parts | Parts | Parts |
| 7 | 100 | 25 | 50 | ½ |
| 8 | 100 | 25 | 50 | 1 |
| 9 | 100 | 25 | 50 | 2 |

The polyvinyl butyraldehyde acetal resin and blown linseed oil are the same as in the examples in Table I. The ingredients are mixed and sheets are prepared in the same manner as in previous examples.

After treating sheets made from the products in Examples 7, 8, and 9 for 2 hours at 135° C., they are found not to be brittle at a temperature as low as −40° C. In contrast, a sheet made from a composition does not contain sulfur but which is otherwise identical is brittle at −28° C., and shows twice as much loss in weight on extraction with ethanol. Comparable differences in swelling are also noted after immersion in ethanol at room temperature for several days.

The compositions of this invention may be formed into sheets or other articles or may be used for coating such materials as cloth, paper, wood, metal, concrete or other material. Cloth, for example, may be advantageously coated and/or impregnated by calendering or by applying a solution of the composition and then evaporating the solution. When advantageous, fillers may be included, as for example, carbon black, whiting and the like.

It is to be understood that the above description is given by way of illustration only, and not of limitation, and that deviations are possible within the spirit of the invention.

What is claimed is:

1. A composition comprising 100 parts of a polyvinyl acetal resin derived from a polyvinyl ester in which at least 30% of the ester groups have been replaced by acetal groups and not more than 50% of the ester groups have been replaced by hydroxyl groups, 0.5-5 parts of sulfur and at least 10 parts of a blown ester of a polyhydric alcohol and a poly-unsaturated aliphatic acid, the acid residues thereof containing more than 9, but less than 21 carbon atoms, the amount of said ester not exceeding its compatibility in said composition.

2. A composition comprising 100 parts of a polyvinyl acetal resin, 0.5–5 parts of sulfur and at least 10 parts of a blown ester of glycerine and a poly-unsaturated aliphatic acid, said acetal resin containing from 5 to 25% hydroxyl groups by weight calculated as polyvinyl alcohol, up to 30% ester groups by weight, calculated as polyvinyl ester and the balance substantially acetal groups, the acid residues of the blown ester containing more than 9 but less than 21 carbon atoms and the amount of said ester not exceeding its compatibility in said composition.

3. A composition comprising 100 parts of a polyvinyl butyraldehyde acetal resin containing from 5 to 25% hydroxyl groups by weight calculated as polyvinyl alcohol, up to 30% ester groups by weight calculated as polyvinyl ester and the balance substantially butyral groups, 0.5–5 parts of sulfur and at least 10 parts of a blown glyceryl ester of a poly-unsaturated acid containing more than 9, but less than 21 carbon atoms, the amount of said ester not exceeding its compatibility in said composition.

4. A composition comprising 100 parts of a polyvinyl butyraldehyde acetal resin containing from 5 to 25% hydroxyl groups by weight calculated as polyvinyl alcohol, up to 30% acetal groups by weight calculated as polyvinyl ester and the balance substantially butyral groups, 0.5–5 parts of sulfur and at least 10 parts of a blown ester of glycerine and 9,12-octadecadieneoate, the amount of said ester not exceeding its compatibility in said composition.

5. A composition comprising 100 parts of a polyvinyl butyraldehyde acetal resin containing 5 to 25% hydroxyl groups by weight calculated as polyvinyl alcohol, up to 30% ester groups by weight calculated as polyvinyl ester and the balance substantially butyral groups, 0.5–5 parts of sulfur and at least 10 parts of blown linseed oil, the amount of said oil not exceeding its compatibility in said composition.

6. A composition comprising 100 parts of a polyvinyl butyraldehyde acetal resin containing 5 to 25% hydroxyl groups by weight calculated as polyvinyl alcohol, up to 30% ester groups by weight calculated as polyvinyl ester and the balance substantially butyral groups, 0.5–5 parts of sulphur and at least 10 parts of blown soy bean oil, the amount of said oil not exceeding its compatibility in said composition.

7. A composition as defined in claim 1 in which the polyhydric alcohol is glycerin.

8. A composition as defined in claim 1 in which the polyvinyl acetal resin is a polyvinyl butyraldehyde acetal resin.

9. A composition as defined in claim 1 in which the polyvinyl acetal resin is a polyvinyl butyraldehyde acetal resin and the polyhydric alcohol is glycerin.

10. A composition as defined in claim 3 in which the acetal resin contains from 10 to 20% hydroxyl groups by weight calculated as polyvinyl alcohol.

11. A composition as defined in claim 3 in which the acetal resin contains from 10 to 20% hydroxyl groups by weight calculated as polyvinyl alcohol and not more than 3% acetate groups by weight calculated as polyvinyl acetate.

12. A composition as defined in claim 3 in which the acid residues of the glyceryl ester contain more than 16 but less than 20 carbon atoms.

13. A composition as defined in claim 4 in which from 40 to 60 parts of a blown ester of glycerin and 9,12-octadecadienoate are present for every 100 parts of polyvinyl acetal resin.

14. A composition as defined in claim 5 in which 40–60 parts of blown linseed oil are present for every 100 parts of polyvinyl acetal resin, the blown oil having an iodine value of 115–130 and a saponification number of 210–225.

MAX O. DEBACHER.

REFERENCES CITED

The following references are of record in the file of this patent:

UNITED STATES PATENTS

| Number | Name | Date |
|---|---|---|
| 2,224,663 | Berg et al. | Dec. 10, 1940 |
| 2,402,910 | Novak | June 25, 1946 |
| 2,402,911 | Novak | June 25, 1946 |

FOREIGN PATENTS

| Number | Country | Date |
|---|---|---|
| 416,412 | Great Britain | Sept. 10, 1934 |